US009919325B2

(12) United States Patent
Alluigi

(10) Patent No.: US 9,919,325 B2
(45) Date of Patent: Mar. 20, 2018

(54) DISPENSING HEAD WITH PRE-COMPRESSION VALVE FOR A TRIGGER DISPENSER DEVICE

(71) Applicant: GUALA DISPENSING S.p.A., Alessandria (IT)

(72) Inventor: Riccardo Alluigi, Alessandria (IT)

(73) Assignee: GUALA DISPENSING S.p.A., Alessandria (IT)

( * ) Notice: Subject to any disclaimer, the term of this patent is extended or adjusted under 35 U.S.C. 154(b) by 0 days.

(21) Appl. No.: 15/305,486

(22) PCT Filed: Feb. 20, 2015

(86) PCT No.: PCT/IB2015/051307
§ 371 (c)(1),
(2) Date: Oct. 20, 2016

(87) PCT Pub. No.: WO2015/162501
PCT Pub. Date: Oct. 29, 2015

(65) Prior Publication Data

US 2017/0043364 A1 Feb. 16, 2017

(30) Foreign Application Priority Data

Apr. 23, 2014 (IT) .............................. BS2014A0086

(51) Int. Cl.
*B65D 88/54* (2006.01)
*G01F 13/00* (2006.01)
(Continued)

(52) U.S. Cl.
CPC ........ *B05B 11/007* (2013.01); *B05B 11/0064* (2013.01); *B05B 11/303* (2013.01);
(Continued)

(58) Field of Classification Search
CPC . B05B 11/007; B05B 11/303; B05B 11/3057; B05B 11/3069
(Continued)

(56) References Cited

U.S. PATENT DOCUMENTS 8,256,648 B2 * 9/2012 Maas .................. B05B 11/0062 222/341
8,439,232 B2 * 5/2013 Laidler ................. B05B 7/0037 222/190
(Continued)

FOREIGN PATENT DOCUMENTS

WO 98/11995 A1 3/1998
WO 2014/013352 A1 1/2014

OTHER PUBLICATIONS

International Search Report for corresponding International Patent Application No. PCT/IB2015/051307 dated May 18, 2015, 3 pgs.
(Continued)

*Primary Examiner* — Vishal Pancholi
(74) *Attorney, Agent, or Firm* — Merchant & Gould P.C.

(57) ABSTRACT

A head (10) of a trigger dispensing device (1) for liquids includes a pre-compression valve (104) disposed in the upper region of the head. The valve (104) has an obturator wall (106) that cooperates with a mouth wall (102) to prevent the passage of liquid. The mouth wall (102) includes a sealing section (**102*a*) with which the obturator wall (106**) is sealingly engaged to slide during a pre-compression step of the liquid.

15 Claims, 5 Drawing Sheets

(51) Int. Cl.
*G01F 11/00* (2006.01)
*B67D 7/58* (2010.01)
*B05B 11/00* (2006.01)

(52) U.S. Cl.
CPC ...... *B05B 11/3057* (2013.01); *B05B 11/3069* (2013.01); *B05B 11/3095* (2013.01); *B05B 11/001* (2013.01); *B05B 11/3035* (2013.01)

(58) Field of Classification Search
USPC ............ 222/251, 321.7, 340, 341, 380, 381, 222/383.1; 239/333; 137/859, 843, 852, 137/853
See application file for complete search history.

(56) References Cited

U.S. PATENT DOCUMENTS

| | | | | |
|---|---|---|---|---|
| 2005/0092778 | A1 | 5/2005 | Bistolfi | |
| 2007/0131718 | A1* | 6/2007 | Bistolfi | B05B 11/0016 222/189.09 |
| 2009/0173751 | A1 | 7/2009 | Laidler et al. | |
| 2010/0155425 | A1* | 6/2010 | Alluigi | B05B 11/303 222/153.09 |
| 2016/0158780 | A1 | 6/2016 | Alluigi | |

OTHER PUBLICATIONS

Italian Search Report for corresponding Italian Patent Application No. BS2014A000086 dated Jan. 8, 2015, 2 pgs.

* cited by examiner

DISPENSING HEAD WITH PRE-COMPRESSION VALVE FOR A TRIGGER DISPENSER DEVICE

This application is a National Stage Application of PCT/IB2015/051307, filed 20 Feb. 2015, which claims benefit of Ser. No. BS2014A000086, filed 23 Apr. 2014, and which applications are incorporated herein by reference. To the extent appropriate, a claim of priority is made to each of the above disclosed applications.

BACKGROUND OF THE INVENTION

This invention covers a manual trigger-dispensing device for liquids, for example for the hygiene of the home, the deodorization of rooms, the treatment of fabrics before ironing, and the like.

Trigger devices are very widespread, as can be seen on supermarket shelves, especially for their ease of use and functionality. Every year many hundreds of millions of pieces are produced.

Among the numerous types, devices provided with pre-compression valve that allows dispensing the liquid only when the pressure in the pressure chamber is greater than a predefined pressure threshold are particularly popular.

See, for example, document WO 98/11995 or document BS2013A000114 in the name of the Applicant.

This allows obtaining numerous advantages, such as a more uniform jet, a longer range, an accentuated vaporisation and still others.

However, to obtain very high pre-compressions, in order to enhance the above advantages, it is necessary to provide special pre-compression valves.

SUMMARY OF THE INVENTION

This purpose is achieved by a device for manual trigger dispensing device according to claim 1. The dependent claims describe advantageous variant embodiments.

BRIEF DESCRIPTION OF THE DRAWINGS

The characteristics and advantages of the device according to this invention will be apparent from the following description, given by way of non-limiting example, in accordance with the accompanying figures, wherein.

DETAILED DESCRIPTION OF THE DRAWINGS

Figure 1:
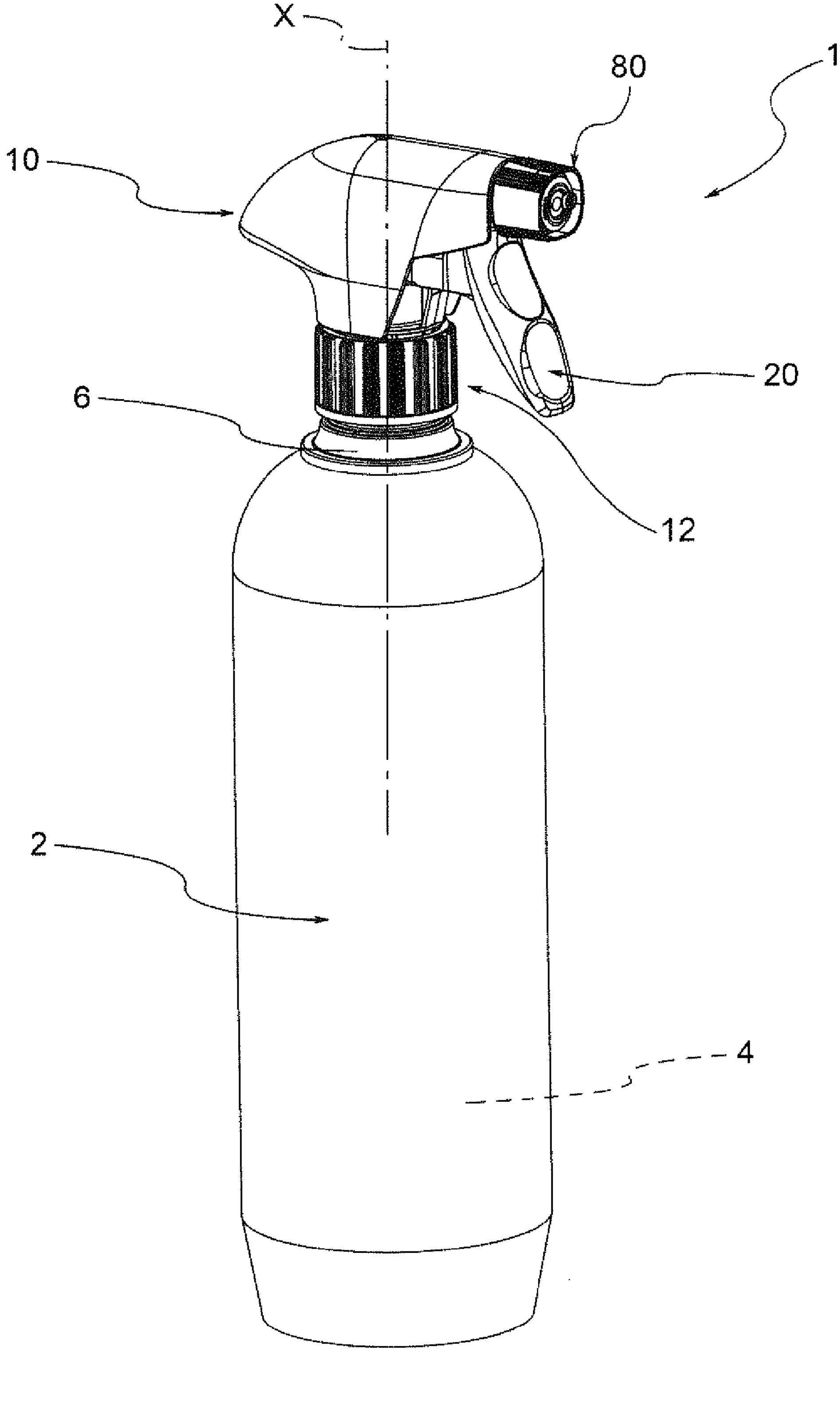
FIG. 1 shows a trigger dispensing device provided with a dispensing head according to this invention, in accordance with an embodiment.

With reference to the attached figures, numeral 1 generally indicates a manual trigger dispensing device.

The device 1 comprises a bottle 2, equipped with a containment compartment 4 for containing a liquid, and a dispensing head 10, generally pre-assembled, applicable to the bottle 2.

For example, the bottle 2 is provided with a neck 6 for connection to the head 10.

Figure 2:
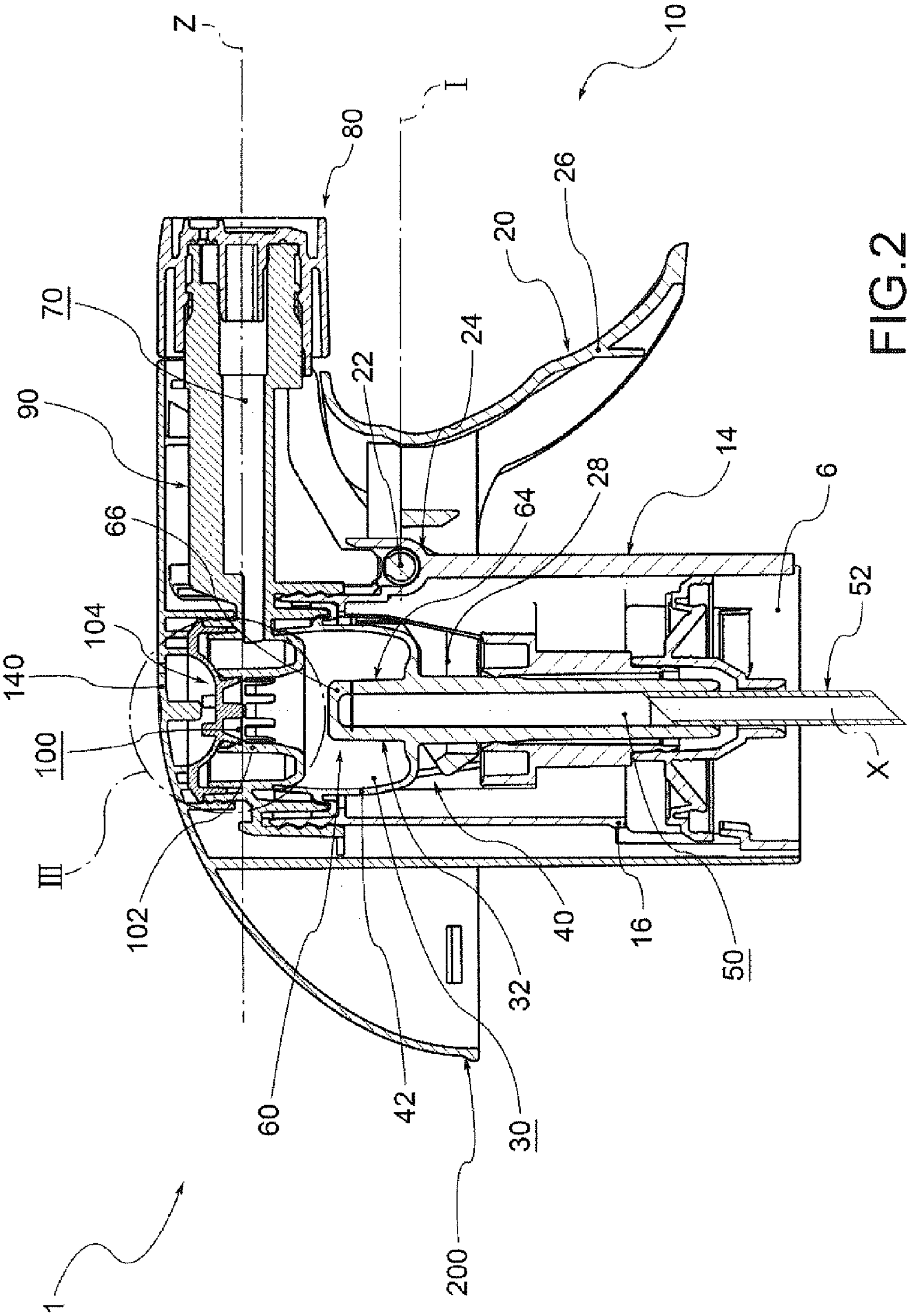
FIG. 2 is a sectional view of a dispensing head according to this invention, in accordance with a further embodiment of the invention.

For example, the neck 6 is externally threaded and the head 10 is provided with a ring nut 12 threaded for connection to the neck 6 (FIG. 1). According to a further example, the head 10 is provided with a snap or bayonet system for connection with the neck 6 (FIG. 2).

The head 10 comprises a frame 14 for the support of components of said head, for example provided with a base foot 16 engageable, by snap or bayonet connection, with the neck 6 of the bottle 2.

The head 10 also comprises a trigger 20, for example supported by the frame 14, for example hinged to this with a hinge element 22 housed in a hinge seat 24 of said frame 14.

The trigger 20 comprises an actuation portion 26 suitable to be engaged by the fingers of a user's hand, and an actuation portion 28 for the actuation of the device 1.

The head 10 further comprises pumping means, suitable to be activated by said trigger 20 for the aspiration, pre-compression and dispensing of the liquid contained in the bottle 2, and a cover 200 for covering the frame and components.

Said pumping means comprise a pressure chamber 30 and pressure means suitable to put pressure on the liquid contained in said pressure chamber 30.

For example, said pressure means comprise a piston 32, translatable along an axis X, suitable to operate on the liquid contained in the pressure chamber 30; the piston 32 is engageable with the trigger 20 to place the liquid under pressure.

For example, the head 10 comprises a pumping element 40 comprising a pressure membrane 42 deformable by the action of the trigger 20; the pressure membrane 42 defines, inside it, the pressure chamber 30 and itself operates as a piston.

Said pumping means further comprise an aspiration duct 50 in connection upstream with the compartment 4 of the bottle, for example through a draft tube 52, and connectable downstream with the pressure chamber 30.

Moreover, said pumping means comprise aspiration valve means suitable to allow the passage of a liquid aspirated by the aspiration duct 50 to the pressure chamber 30 during an aspiration step and to prevent the return of the liquid contained in the pressure chamber 30 from said pressure chamber 30 to the aspiration duct 50.

Said aspiration valve means comprise a non-return valve 60.

For example, the pumping element 40 comprises a shank 62 projecting into the pressure chamber 30, provided with a slit 64 that makes a passage from the pressure chamber 30 to the aspiration duct 50, and a flexible blocking lip 66 sensitive to the pressure in the pressure chamber 30, suitable to close said slit 64.

The shank 62, the slit 64 and the blocking lip 66 realize an example of the aspiration valve means.

According to further embodiment variants, the aspiration means comprise a rigid blocking element, such as ball, and a blocking seat that can be blocked by said rigid blocking element.

Said pumping means further comprise a dispensing duct 70 connectable upstream with the pressure chamber 30 and connectable downstream with the external environment.

For example, the head 10 comprises a nozzle assembly 80 into which the dispensing duct 70 opens; the nozzle assembly 80 is suitable to be manoeuvred, for example rotated, to close the access of the dispensing duct 70 to the outside.

The dispensing duct 70 extends along a dispensing axis Z, for example orthogonal to the piston axis X. An imaginary plane I is defined as the plane passing through the centre of rotation of the trigger 20, identified by the centre of rotation of the hinge element 22, and parallel to the dispensing axis Z of the dispensing duct 70.

According to further embodiment variants, the piston axis is incident to the dispensing axis, but not orthogonal to it.

For example, the head 10 comprises a secondary frame 90, separate from the frame 14, in which the dispensing duct 14 is formed. The nozzle assembly 80 is applied to said secondary frame 90.

For example, the secondary frame 90 is snap-engageable with the frame 14, so that the pumping element 40 is clamped between them.

In further embodiment variants, the frame 14 and the secondary frame 90 are made in one piece.

Said pumping means further comprise pre-compression valves operating between the pressure chamber 30 and the dispensing duct 70 and suitable to allow the passage of liquid from the pressure chamber 30 to the dispensing duct 70 when the pressure in the pressure chamber 30 exceeds a predetermined pressure threshold and suitable to prevent the passage of liquid from the pressure chamber 30 to the dispensing duct 70 when the pressure in the pressure chamber 30 is lower than a predetermined pressure threshold.

For example, said pressure threshold is greater than 1 bar; more preferably, said pressure threshold is greater than 3 bar.

Having identified the imaginary plane I, the pre-compression valve means are arranged on the same side of the dispensing axis Z of the dispensing duct 70.

The pre-compression valve means comprise a pre-compression mouth 100 placed between the pressure chamber 30 and the dispensing duct 70, annularly delimited by a mouth wall 102.

Preferably, the piston axis X that intercepts the pre-compression mouth 100 and the mouth wall 102, which partially delimits the pressure chamber 30, extends along said piston axis X, for example, coaxially to it.

Preferably, said mouth wall (102) is part of the secondary frame 90 and is made in one piece with it.

The pre-compression valve means further comprise a pre-compression valve 104 cooperating with said mouth wall 102 to prevent the passage of the liquid from the pressure chamber 30 to the dispensing duct 70.

The pre-compression valve 104 is made in a single piece of deformable plastic material; for example, made of LDPE (Low Density Polyethylene) or EVA.

Figure 3A:
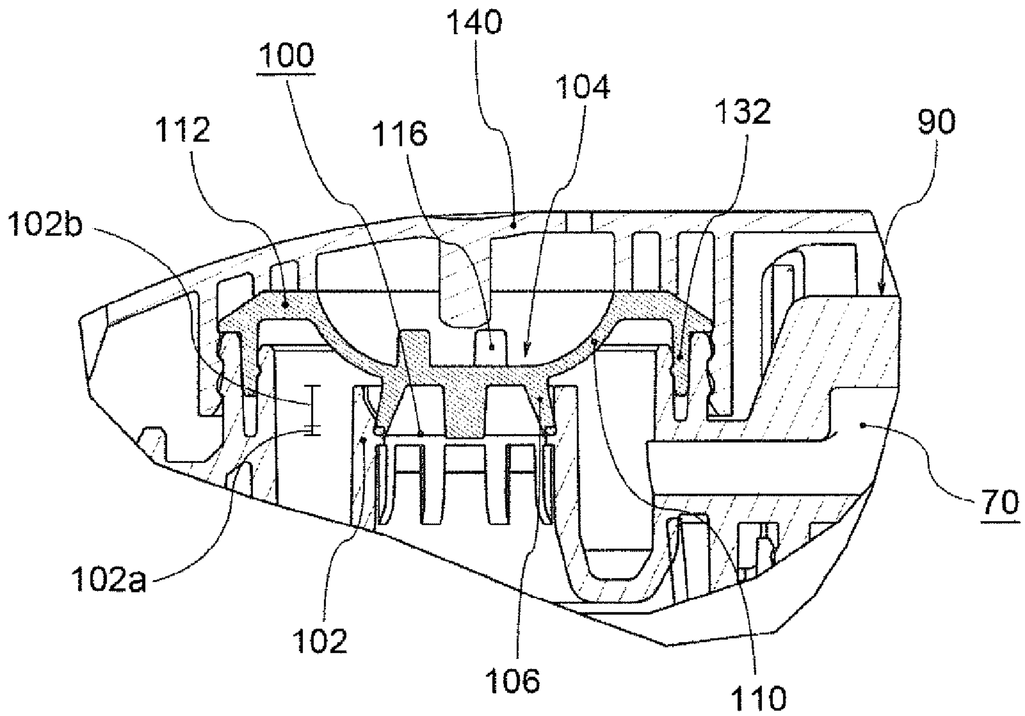
FIG. 3*a* shows an enlargement of detail III of FIG. 2, which relates to a pre-compression valve and a mouth wall according to an embodiment of this invention.

The valve 104 includes an annular obturator wall 106 suitable to sealingly engage with a sealing section 102*a* of the mouth wall 102. Furthermore, said mouth wall 102 comprises a dispensing section 102*b*, for example flared with respect to the sealing section 102*a* (for example shown in FIG. 3*a*), suitable to create a dispensing passage with the obturator wall 106 that connects the pressure chamber with the dispensing duct.

Figure 3B:
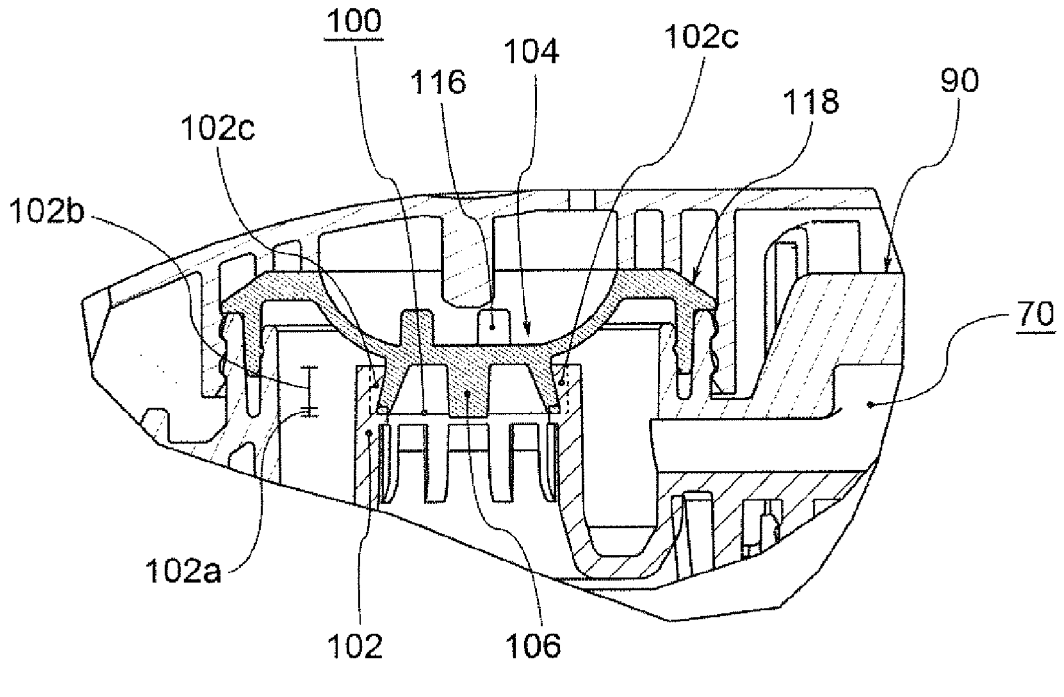
FIGS. 3*b* and 3*c* show further embodiments of the pre-compression valve and the mouth wall according to this invention.

According to further variant embodiments, the dispensing section 102*b* has a plurality of by-pass ducts 102*c* (for example shown in FIG. 3*b*), so that the obturator wall 106 remains in contact with the mouth wall, but said by-pass ducts together form the dispensing passage.

Figure 3C:
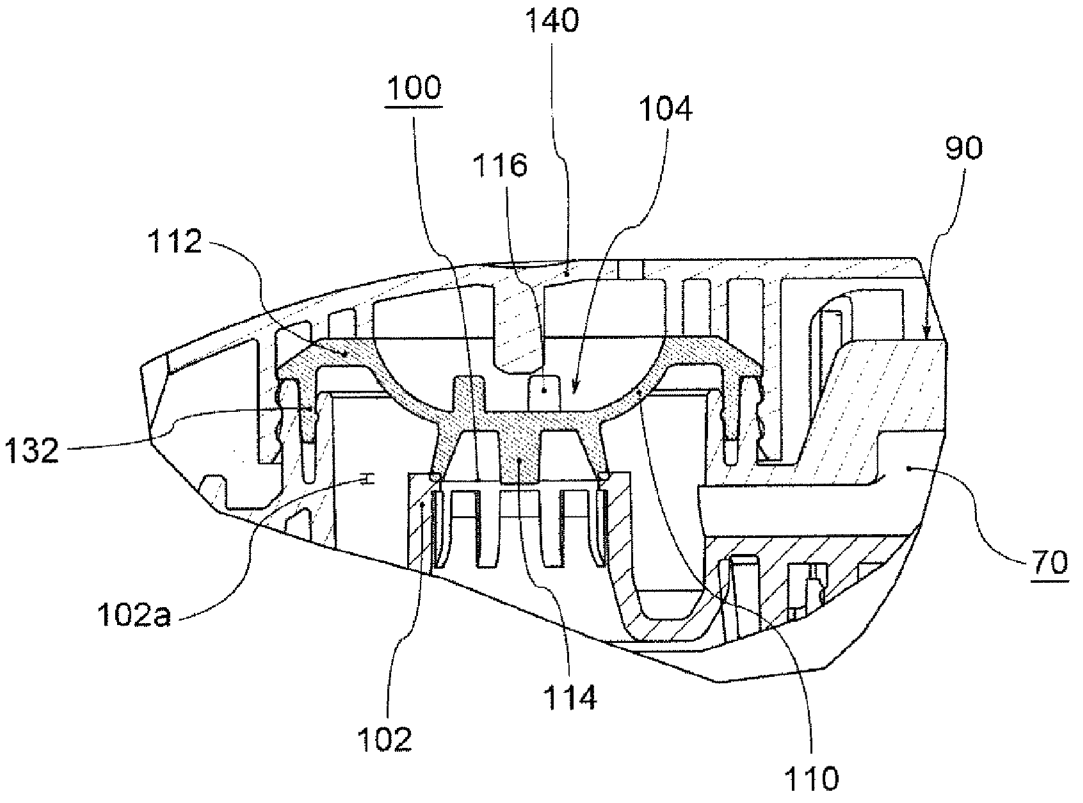
Figure 4C:
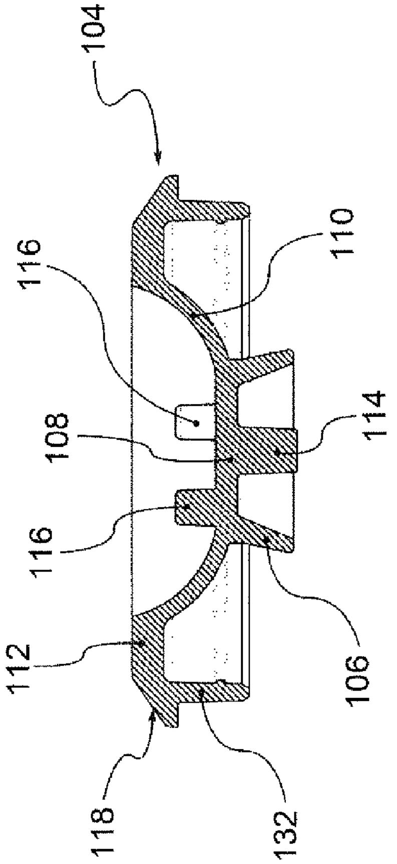
FIG. 4*c* shows a sectional view of the valve of FIGS. 4*a* and 4*b*.
Figure 4D:
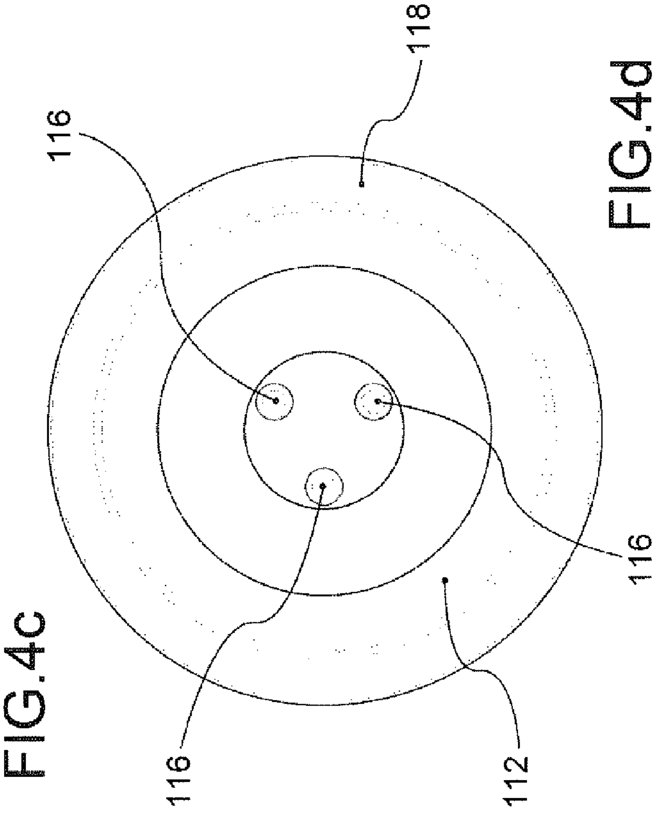
FIGS. 4*a* and 4*b* show the pre-compression valve of FIG. 3*a;*
Figure 4A:
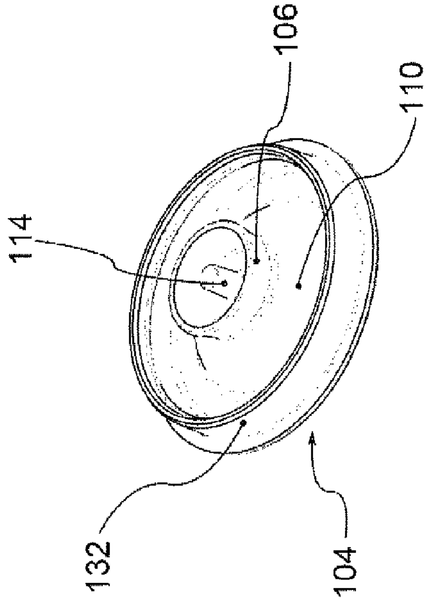
Figure 4B:
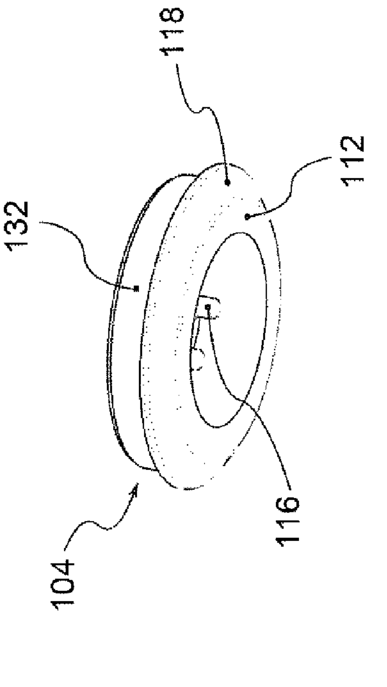

According to a still further variant embodiment, the mouth wall 102 provides only the sealing section 102*a*, passing through which the obturator wall disengages from said mouth wall 102, i.e., is no longer in contact with it (for example, as shown in FIG. 3*c*).

Preferably, externally (i.e., from the part of the dispensing duct 70) the obturator wall 106 has a truncated-conical surface; preferably, internally (i.e., from the part of the pressure chamber 30) the obturator wall 106 has a truncated-conical surface.

Additionally, the valve 104 comprises a bottom 108, from which said obturator wall 106 protrudes towards the pressure chamber 30. Preferably, externally the bottom 108 is flat; preferably, internally the bottom 108 is flat.

Additionally, the valve 104 comprises a membrane valve 110 that protrudes radially outwardly from the obturator wall 106, also extending radially outside of the mouth wall 102.

Preferably, the membrane valve 110 has a variable thickness between 0.2 and 0.5 millimeters.

In an undeformed condition, the membrane valve 110 has a convex surface facing the mouth wall 102 and a concave surface on the other side. The convex surface is joined with the external truncated-conical surface of the obturator wall 106; the concave surface is joined with the internal flat surface of the bottom 108.

Additionally, the valve 104 comprises an annular base 112 that extends radially outward from the membrane valve 110, in a crown shape coaxial to the obturator wall 106, preferably countersunk peripherally, so as to form a truncated-conical surface 118.

Also, preferably, the valve 104 comprises at least one forcing protuberance 114, protruding internally from the bottom 108 and suitable to come into contact with the piston 32 for the forced opening of the pre-compression valve.

Preferably, moreover, the valve 104 comprises at least one abutment projection 116, protruding outward from the bottom 108, suitable to create an end-of-stroke abutment end of stroke for the valve 104 in deformation.

The valve 104 is applied to an annular valve support wall 130, preferably coaxial to the obturator wall 106 and/or the piston axis X.

Preferably, the valve support wall 130 is made in a single piece with the mouth wall 102; preferably, moreover, the valve support wall 130 is part of the secondary frame 90 and made in one piece with it.

For example, the base 112 of the valve 104 is placed in abutment with the end of the valve support wall 130.

Also, for example, the valve 104 comprises a skirt 132 projecting axially peripherally from the base 112 towards the obturator wall 106; the skirt 132, disposed radially externally to the obturator wall 106 and preferably also to the membrane valve 110, sealingly engages the valve support wall 130. Preferably, moreover, said skirt 132 is inserted into an axial pocket 134 of said valve support wall 130.

In addition, said pre-compression valve means comprise valve retention means suitable to locking the pre-compression valve 104 in position.

For example, said valve retention means comprise a portion of said cover 200.

According to further embodiment variants, the valve retaining means comprise a separate retaining element suitable to snap-engage with the valve support wall to clamp the pre-compression valve and, in particular, its base, locking it in position.

On first use of the device 1, the pressure chamber 30 is empty. Repeated pressing of the trigger causes the aspiration of liquid from the compartment 4 of the bottle 6, while the mechanical interference between the piston 32 and the pre-compression valve 104 (and in particular between the piston 32 and the forcing protuberance 114 allow forcingly opening said pre-compression valve 104 for the escape of the air contained in the pressure chamber 30.

In normal use of the device 1, the actuation of the trigger 20 allows activating the pumping means. In particular, the trigger 20 activates the piston 32 which puts the liquid in the pressure chamber 30 under pressure.

In a pre-compression step, the action due to the pressure in the pressure chamber 30 influences the pre-compression valve 104, deforming the membrane valve 110.

The obturator wall 106, due to the deformation of the membrane valve 110, slides sealingly against the sealing section 102*a* of the mouth wall 102, thus keeping obstructed the passage from the pressure chamber to the dispensing duct.

For example, the sealing section 102*a* has a length between 0.2 and 0.4 millimeters.

When the pressure in the pressure chamber 30 exceeds a predefined pressure threshold, the obturator wall 106 is disengaged from the mouth wall 102 or engaged with the dispensing section 102*b* of this, in both cases allowing the dispensing of the liquid from the pressure chamber 30 to the dispensing duct 70 through the dispensing passage.

After dispensing the liquid, the pressure in the pressure chamber 30 drops abruptly, so that the pre-compression valve 104 returns to the initial condition in which the obturator wall 106 is sealingly engaged with the sealing section 102*a* of the mouth wall 102.

Innovatively, the device according to this invention meets the needs of the industry, since it allows dispensing the liquid as a result of marked pre-compression.

Advantageously, moreover, it allows easily converting a dispensing device with pre-compression into a dispensing device with different type of pre-compression, for example, less thrust (which is the device referred to document BS2013A000114 in the name of the Applicant), or even into a dispensing device without pre-compression.

In fact, advantageously, the pre-compression valve is placed in the upper zone of the head, directly upstream of the dispensing duct, and is easily replaced with a different pre-compression valve or with a lip that performs no predefined pre-compression.

It is clear that one skilled in the art, in order to meet specific needs, may make changes to the device described above, all contained within the scope of protection defined by the following claims.

The invention claimed is:

1. A dispensing head for a trigger dispensing device for liquids, comprising:

a frame for supporting components;

a pump suitable for creating an aspiration, a predefined pre-compression of the liquid and for dispensing the liquid, comprising a pressure chamber, a piston operating in the pressure chamber along a piston axis, a dispensing duct extending along a dispensing axis orthogonal to the piston axis, and a pre-compression valve assembly operating between the pressure chamber and the dispensing duct;

a trigger comprising a hinge element hinged to the frame and suitable for activating said piston;

wherein an imaginary plane is defined passing through an axis of rotation of the hinge element of the trigger and parallel to the dispensing axis;

and wherein the pre-compression valve assembly comprises:

i) a pre-compression mouth annularly defined by a mouth wall wherein the piston axis is incident to said pre-compression mouth;

ii) a pre-compression valve placed on a same side of the dispensing duct as the imaginary plane and comprising an obturator wall which acts in conjunction with the mouth wall to prevent passage of liquid, wherein the pre-compression valve comprises a valve membrane which protrudes radially outwardly from the obturator wall and extending radially outside the mouth wall;

wherein the mouth wall comprises a sealing section with which said obturator wall is sealingly engaged to slide during a pre-compression step of the liquid, wherein the pre-compression valve comprises at least one forcing protuberance suitable to come into contact with the piston for forced opening of the pre-compression.

2. Head according to claim 1, wherein said mouth wall comprises a dispensing section to define a liquid passage with the obturator wall.

3. Head according to claim 2, wherein the dispensing section is flared.

4. Head according to claim 2, wherein the dispensing section comprises by-pass ducts.

5. Head according to claim 2, wherein, beyond the sealing section, the obturator wall disengages from contact with the mouth wall.

6. Head according to claim 1, comprising a secondary frame, the dispensing duct being formed in said secondary frame, said secondary frame being engageable with the frame.

7. Head according to claim 6, wherein the mouth wall is part of said secondary frame and made in one piece therewith.

8. Head according to claim 1, wherein the pre-compression valve comprises a bottom, from which said obturator wall protrudes towards the pressure chamber.

9. Head according to claim 1, wherein the pre-compression valve comprises an annular base which extends radially outwards from the valve membrane.

10. Head according to claim 1, wherein the pre-compression valve comprises at least one abutment projection suitable to form an end stroke abutment for the valve in deformation.

11. Head according to claim 1, wherein the pre-compression valve is applied to an annular valve support wall, in one piece with the mouth wall.

12. Head according to claim 1, wherein the pre-compression valve comprises a skirt axially projecting peripherally from the base towards the obturator wall to sealingly engage a valve support wall.

13. Head according to claim 1, wherein the pre-compression valve assembly comprises a valve retainer suitable to block the pre-compression valve in position.

14. Head according to claim 13, wherein the valve retainer comprises a cover portion.

15. Head according to claim 13, wherein the valve retainer comprises a separate retention element suitable to snap-engage with a valve support wall to pinch the pre-compression valve.

* * * * *